(12) United States Patent
Grunewald (10) Patent No.: US 11,919,731 B2
(45) Date of Patent: Mar. 5, 2024

(54) BLOCKING APPARATUS FOR A TRUCK

(71) Applicant: Niclas Grunewald, Hanstedt (DE)

(72) Inventor: Niclas Grunewald, Hanstedt (DE)

( * ) Notice: Subject to any disclaimer, the term of this patent is extended or adjusted under 35 U.S.C. 154(b) by 25 days.

(21) Appl. No.: 17/440,845

(22) PCT Filed: Feb. 14, 2020

(86) PCT No.: PCT/EP2020/053965
§ 371 (c)(1),
(2) Date: Sep. 20, 2021

(87) PCT Pub. No.: WO2020/193007
PCT Pub. Date: Oct. 1, 2020

(65) Prior Publication Data
US 2022/0144565 A1  May 12, 2022

(30) Foreign Application Priority Data

Mar. 27, 2019 (DE) .................... 10 2019 107 912.8

(51) Int. Cl.
*B65G 69/00* (2006.01)
(52) U.S. Cl.
CPC ........ *B65G 69/003* (2013.01); *B65G 2207/40* (2013.01)
(58) Field of Classification Search
CPC .................................................. B65G 69/003
See application file for complete search history.

(56) References Cited

U.S. PATENT DOCUMENTS

| | | | | |
|---|---|---|---|---|
| 4,818,170 A * | 4/1989 | Fisher | ................... | B65G 69/003 414/401 |
| 4,964,777 A * | 10/1990 | Kleynjans | ............ | B65G 69/003 414/584 |
| 5,203,663 A * | 4/1993 | Ruppe | ................... | B65G 69/003 414/584 |
| 5,212,846 A * | 5/1993 | Hahn | ................... | B65G 69/003 14/71.1 |
| 5,249,905 A | 10/1993 | Warner et al. | | |
| 6,062,796 A | 5/2000 | Alexander | | |
| 6,488,464 B1 | 12/2002 | Kish | | |
| 7,165,486 B2 * | 1/2007 | Alexander | .............. | F15B 11/20 91/530 |

(Continued)

FOREIGN PATENT DOCUMENTS

| EP | 548633 A1 * | 6/1993 | ........... B65G 69/003 |
|---|---|---|---|
| EP | 2390207 A1 | 11/2011 | |

(Continued)

OTHER PUBLICATIONS

European Patent Office, Rijswijk, Netherlands, International Search Report of International Application No. PCT/EP2020/053965, dated May 19, 2020, 2 pages.

*Primary Examiner* — Mark C Hageman
(74) *Attorney, Agent, or Firm* — Dickinson Wright PLLC (57) ABSTRACT

A blocking device (11) for a truck (2) is provided. The blocking device (11) includes at least one height-adjustable blocking arm (24), wherein the at least one blocking arm (24) includes a telescopable plunger (29). The plunger (29) is movable from below the truck (2) against a truck underride guard (5), whereby a rolling-away or driving-away of the truck is prevented.

10 Claims, 7 Drawing Sheets

(56) References Cited

U.S. PATENT DOCUMENTS

| | | | |
|---|---|---|---|
| 7,249,926 B1* | 7/2007 | Mayer | B65G 69/003 414/401 |
| 2004/0005210 A1* | 1/2004 | Alexander | B65G 69/003 414/584 |
| 2004/0042882 A1* | 3/2004 | Breen | B65G 69/003 414/401 |
| 2006/0045678 A1* | 3/2006 | Andersen | B65G 69/2817 414/401 |
| 2007/0258798 A1* | 11/2007 | Foster | B65G 69/003 414/331.01 |
| 2008/0042865 A1 | 2/2008 | Shephard et al. | |
| 2015/0239686 A1 | 8/2015 | Stone et al. | |
| 2017/0101278 A1 | 4/2017 | Stone et al. | |
| 2019/0009999 A1 | 1/2019 | Schlintz et al. | |
| 2020/0125074 A1* | 4/2020 | Ramos | G05B 19/4155 |
| 2020/0255234 A1* | 8/2020 | Sveum | B65G 67/20 |

FOREIGN PATENT DOCUMENTS

| | | | |
|---|---|---|---|
| GB | 2195607 A | 4/1988 | |
| WO | 9303227 A1 | 2/1993 | |

\* cited by examiner

BLOCKING APPARATUS FOR A TRUCK

TECHNICAL FIELD

The invention relates to a blocking device for a truck.

BACKGROUND

Loading and unloading stations serve for the loading or unloading of trucks. For this purpose a loading and unloading station includes a plurality of ramps onto which a truck can drive up.

The problem can arise here that a truck, when it has driven up onto a ramp of the loading or unloading station, rolls back, because, for example, the handbrake has not been properly applied. There is thus not only the risk that the load is damaged, but also that personnel are injured.

From U.S. Pat. No. 7,249,926 B1 a blocking device for a truck is known wherein a blocking arm is fixedly disposed in a shaft in the base in front of a loading and unloading station. The locking arm is disposed in the shaft only partially recessed and vertically and cannot be moved. In the blocking arm a plunger is telescopically disposed that is extensible from the shaft in the vertical direction until its upper end lies adjacent to an underride guard of a truck driven up onto the loading and unloading device. This known blocking device has the disadvantage that for construction reasons a spacing always remains between the underride protection device and the plunger. On the one hand the spacing must ensure that during extending, the plunger does not impinge against the underride guard from below, and on the other hand that the blocking device also functions when the underride guard is attached to the truck farther forward or farther back. In each case the mentioned spacing means that the plunger only abuts against the underride guard and prevents a further rolling-away of the truck when the truck has already moved a small amount forward (in the direction of travel). However, a gap then arises between the rear of the truck and the ramp, which gap can lead to accidents.

A further disadvantage of the known blocking device is that the blocking arm is not completely recessable into the shaft of the base. Since a large part of the blocking device is therefore always disposed above the base, even when no truck has docked onto the ramp, the part of the known blocking device protruding over the base can not only be easily damaged, but it also hinders the cleaning of the base in front of the ramp and represents an accident risk for passers-by.

SUMMARY

The object of the present invention is to provide a device, using which it is possible to position a truck on a ramp of a loading and unloading station such that the truck can no longer move from the position.

The invention thus relates to a blocking device for a truck that has been driven up onto a ramp of a loading and unloading station. The blocking device is disposed such that the underride guard attached to the rear of the truck is moved away by means of the blocking protection device when the truck is driven backwards onto the ramp. This blocking device comprises at least one height-adjustable blocking arm, wherein the at least one blocking arm includes a telescopable plunger, wherein the plunger is movable from below the truck against a truck underride guard, whereby a rolling-away or driving-away of the truck is prevented. Here the telescopable plunger can be disposed in the interior of the blocking arm so that this plunger can extend from the blocking arm. However, it is also possible that the plunger is, for example, laterally attached to the blocking arm.

In particular, the invention relates to a blocking device for a truck, comprising at least one height-adjustable blocking arm housed in a shaft in the base in front of a ramp of a loading and unloading station, wherein the at least one blocking arm is extendable from the shaft and includes a telescopable plunger, wherein the plunger is movable from below the truck against a truck underride guard, so that the truck underride guard is fixed between the plunger of the at least one blocking arm and the ramp, whereby a rolling-away or driving-away of the truck is prevented.

It is advantageous that this blocking device is introduced in a base directly in front of a ramp of a loading and unloading station. The blocking device 10 is thus recessed in a shaft in the base in front of the ramp and provided with a cover that is flush with the base.

An advantage of this blocking device is that a truck that has been driven up onto a ramp of a loading and unloading station can be positioned in place. For this purpose the cover is first removed, and then the at least one blocking arm is extended, wherein a section of the blocking arm provided with the plunger is pivotable upward out of the shaft until it is oriented obliquely upward and directed against the direction of travel of the truck, toward the underride guard.

Here a section of the blocking arm, which section is provided with the plunger, is advantageously pivotable upward out of the shaft until it is oriented obliquely upward and opposite the direction of travel of the truck, toward the underride guard.

On its front section the plunger advantageously includes a stop surface, and with extended blocking arm is telescopically extendable obliquely upward and opposite the direction of travel of the truck until it abuts with its stop surface against the underride guard, and the underride guard presses against the ramp with a force component acting opposite the direction of travel of the truck until the truck is fixed between the stamp and the ramp. In this way the plunger of the at least one blocking arm is moved against a truck underride guard of the truck such that the truck underride guard is fixed between the plunger of the at least one blocking arm and the ramp. Due to the fixing, the truck is prevented from rolling away, or from being readily driven away.

Here the plunger extends obliquely upward but also simultaneously rearward opposite the direction of travel of the truck and can traverse a spacing perhaps initially present between its stop surface and the underride guard of the truck, until the stop surface abuts against the underride guard. The invention thereby ensures that any possibly existing gap or spacing disappears, so that the truck cannot roll even a small amount, which corresponds to the gap width or to the mentioned spacing, in the direction of travel.

In addition, the inventive blocking device is able to eliminate a possible spacing or gap occurring between the truck or its underride guard on the one side, and the ramp or a buffer device attached to the ramp on the other side, due to the plunger pressing against the underride guard pressing the entire truck toward the ramp, until the truck or its underride guard abuts by its rear (opposite the direction of travel) side against the ramp. In this way a risk of injury can advantageously be eliminated; this risk arises due to a gap between the ramp and the truck, and a person could fall into the gap or trip.

In one preferred embodiment the blocking device is disposed in a housing that is part of the blocking device. It is advantageous in this assembly that the entire blocking device can be pulled out very easily from the shaft in the base, for example, if the blocking device requires maintenance.

One advantageous embodiment of the invention provides that the blocking device recessed in the shaft in front of the ramp in the base includes a cover that is flush with the base and by which the shaft is closable. The cover is disposed on the top side of the housing.

In a further preferred embodiment, the blocking device includes a pressure switch, via which the plunger of the at least one blocking arm is readjustable. Since the plunger is operated hydraulically or pneumatically, it can happen that the pressure drops over time, and thus the plunger of the at least one blocking arm no longer fixedly abuts against the truck underride guard. This can result in the truck rolling partly away from the ramp, whereby a gap arises between the ramp and a loading surface of the truck. Not only can goods be damaged due to this gap, but there is also a risk of injury to persons who may trip over it, for example.

The blocking device preferably includes two blocking arms, wherein each of the blocking arms includes a telescopable plunger. Such a blocking device is particularly stable, since two plungers guarantee that the truck cannot roll away or be driven away. It is understood that a blocking device including more than two blocking arms, for example, including three or four blocking arms, can also be provided, wherein each blocking arm in turn carries a plunger that is disposed on or in the corresponding blocking arm. However, the telescopable plungers are preferably disposed in the blocking arm since the plungers lie stable and protected in the blocking arms.

The invention also relates to an assembly comprising the blocking device as well as the loading and unloading station, wherein the blocking device is disposed in front of the ramp of the loading and unloading station. Here the blocking device is located in a shaft in front of the ramp. It is understood that the loading and unloading station can comprise a plurality of ramps, and that such a blocking device is disposed in front of each ramp. It is advantageous that the blocking device includes a cover that can be selectively opened and closed. If the cover covers the shaft, then the cover is disposed in the same plane as the base, so that the base and the cover form a plane. This prevents a person from being able to trip over the cover.

The blocking device of the assembly preferably includes a sensor which can determine whether a truck has driven up onto the ramp of the loading and unloading station. Only when the truck has driven up the ramp, and therefore stands above the blocking device, is the cover removed and thus the shaft opened. An early opening of the shaft is thus prevented, and thus also the risk that a person is injured by tripping over the shaft.

A method is also described for blocking a truck using the assembly or the blocking device, wherein the method includes the following successive steps:

In a first step, the truck drives up onto the ramp of the loading and unloading station. In a second step the sensor registers as soon as the truck has driven up onto the ramp of the loading and unloading station and returns a signal to a control unit of the blocking device. Subsequently in a third step, the at least one blocking arm is extended. In a fourth step, the plunger of the at least one blocking arm is moved against the truck underride guard of the truck, so that the truck underride guard is fixed between the plunger of the at least one blocking arm and the ramp, whereby the truck is also retained in this position.

The cover of the blocking device is preferably removed between the second and the third step, and the shaft thus opened. Since at this point in time the truck already stands above the shaft, a person is prevented from stepping into the shaft and thus being injured.

In one preferred embodiment, a pressure switch of the plunger registers when the plunger no longer abuts against the truck underride guard of the truck. In this case the plunger drives back against the truck underride guard of the truck, so that a gap cannot appear between the ramp and the loading surface of the truck, since such a gap involves a risk of injury.

It is also explicitly proposed to combine a plurality of features of the individually described embodiments with one another.

The present invention is explained in more detail below based on the accompanying drawings.

DETAILED DESCRIPTION OF THE DRAWINGS

Figure 1:
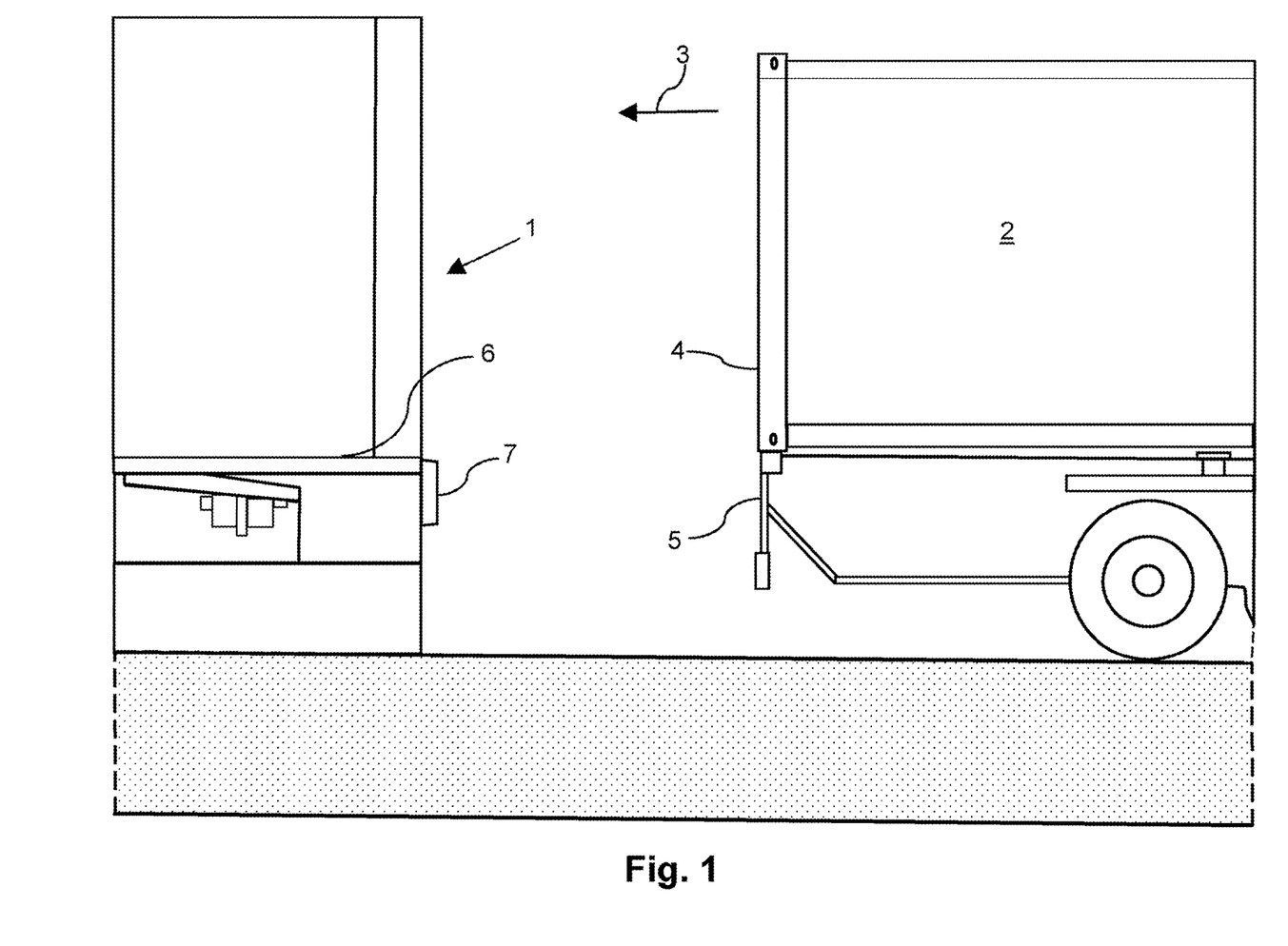
FIG. 1 depicts a side view of a loading and unloading station, onto which a truck drives up.

FIG. 1 depicts a side view of a loading and unloading station 1 onto which a truck 2 drives straight backwards, as is indicated by the arrow 3. At its rear side 4 the truck features a truck underride guard 5. The loading and unloading station 1 includes a ramp 6 on which the truck 2 can be loaded or unloaded. The loading and unloading station 1 also includes a buffer device 7 which serves to avoid damage to the truck 2 when it drives backward onto the ramp 6. Loading and unloading stations for trucks are known to a person skilled in the art, for which reason they are not described in more detail.

Figure 2:
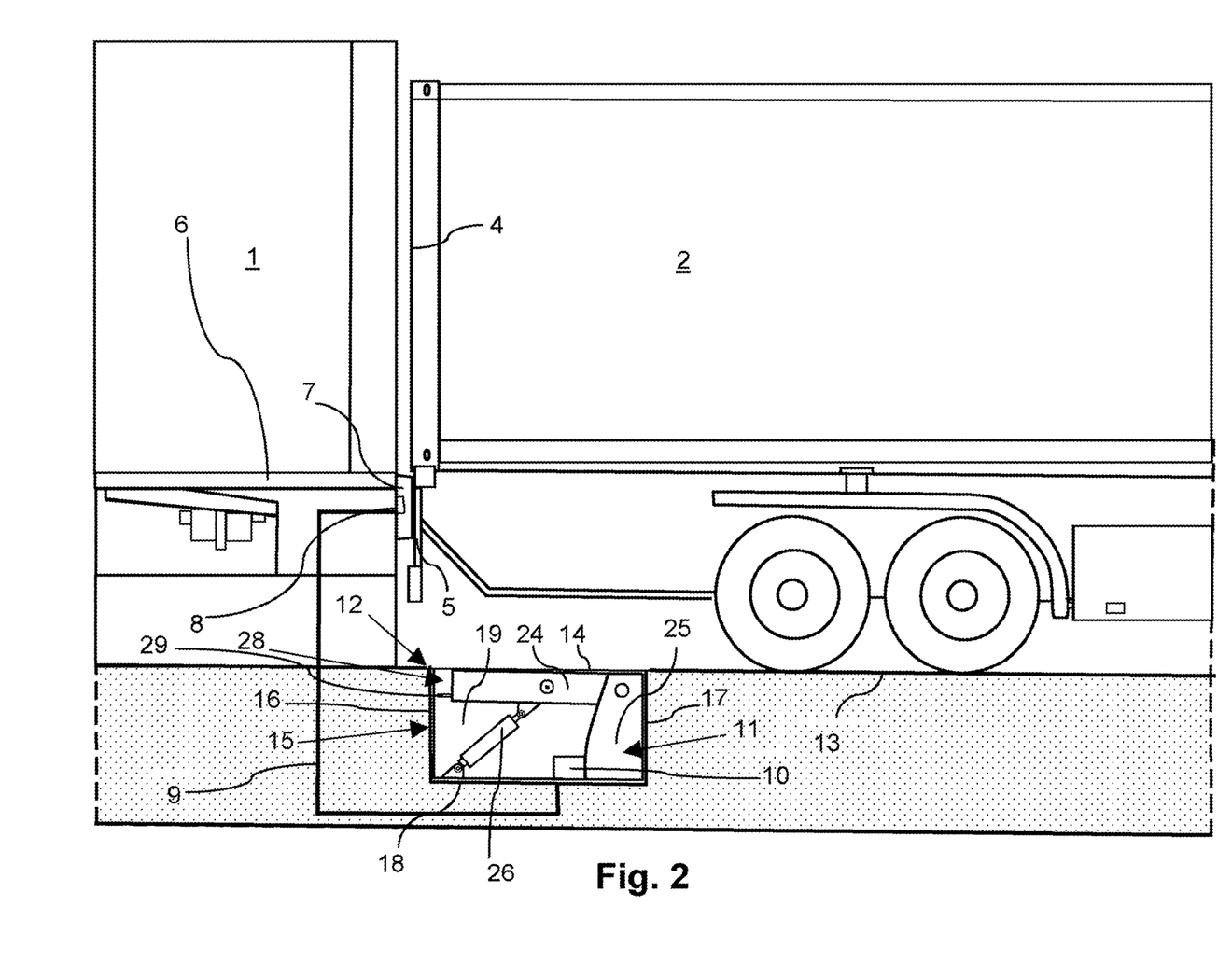
FIG. 2 depicts a second side view of the loading and unloading station according to FIG. 1, wherein a blocking device is provided in front of the loading and unloading station.

In FIG. 2 the truck 2 is already driven up onto the ramp 6, so that the truck 2 is in contact with the buffer device 7 by the truck underride guard 5. That the truck 2 is in contact with the buffer device 7 is recognized by a sensor 8. This sensor 8 can be, for example, a camera that is attached to the loading and unloading station 1. In particular, the sensor 8 configured as a camera can be attached below the buffer device 7 (not shown). However, the sensor 8 can also be configured—as is the case in FIG. 2—as a pressure sensor 8, which is provided in the buffer device 7. As soon as the truck 2 contacts the buffer device 7 by its truck underride guard 5, this is registered by the sensor 8.

The sensor 8 is connected to a control unit 10 via a line 9, which is schematically depicted in FIG. 2. Here the control unit 10, the sensor 8, and the line 9 are part of the blocking device 11. This blocking device 11 is housed in a shaft 12, which is embedded in a base 13, wherein the shaft 12 and thus the blocking device 11 disposed therein are disposed in front of the ramp 6. The shaft 12 is closed by a cover 14.

When the shaft 12 is closed by the cover 14, then the cover 14 is disposed in the same plane as the base 13. This prevents a person (not shown) from being able to trip over the cover 14.

The cover 14 is part of a housing 15, wherein three side walls 16, 17, 19 as well as the base 18 of the housing 15 are visible. The housing 15 contains not only the control unit 10, but also a blocking arm 24, which is movably disposed on a holder 25. A piston rod 26 can move the blocking arm 24 at least partially out of the housing 15 as soon as the housing 15 is opened. Here the blocking arm 24 can be moved hydraulically, electrically, or mechanically via the piston rod 26.

In the blocking arm 24 there is a telescopable plunger, of which only a first front section 29 is depicted. The first front section 29 is disposed on a second rear section. The second section is not visible in FIG. 1, since this second section has not yet been extended from the blocking arm 24.

It is understood that the blocking device 11 can also be installed in the shaft 12 without this blocking device 11 being disposed in a housing. In this case a cover is nonetheless provided that can close the shaft. However, if the blocking device 11 includes a housing 15, then this has the advantage that the blocking device 11 can be easily removed from the shaft 12, for example, if the blocking device 11 must be maintained or replaced.

Figure 3:
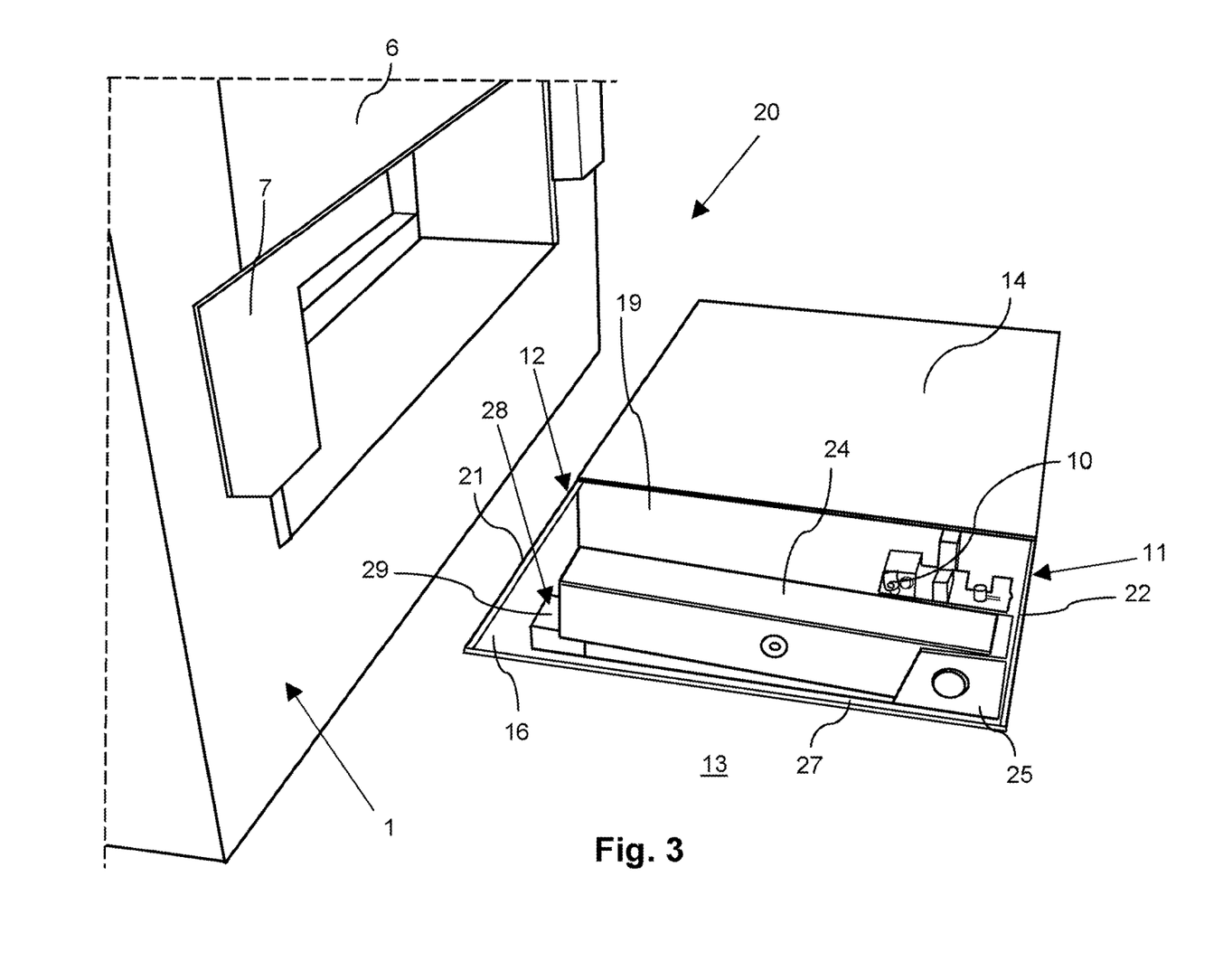
FIG. 3 provides a perspective plan view of the blocking device according to FIG. 2, including a blocking arm.

In FIG. 3 the blocking device 11 as well as the loading and unloading station 1 are depicted, which together form an assembly 20. For the sake of clarity the truck is not depicted. However, it is evident in FIG. 3 that the cover 14 of the housing 15 has already been removed, wherein three side walls 16, 19, and 27 of the housing 15 are visible. In order that the housing 15 can be opened, in the region of the base 13 the housing 15 features two parallel rails 21, 22, along which, after these rails 21, 22 have been raised slightly by a drive, for example, an electric or a pneumatic drive (not visible), the cover 14 is moved in the direction of the arrow 23, so that the cover 14 finally rests adjacent to the shaft 12 on the base 13, as can be seen in FIG. 3. The housing 15 is thus opened, whereby the blocking arm 24 can be moved out of the housing 15. As can be seen in FIG. 3, the blocking device 11 includes only one blocking arm 24. However, it is also possible that the cover 14 is fixedly installed and that the housing cannot be opened completely. In this case the rails 21, 22 are not required. Instead, an opening can be provided (not depicted) out of which the blocking arm 24 can be extended. Here the blocking arm 24 lies in the rest position of the opening, so that it forms a plane with the cover 14 and the base 13. Thus a person is prevented from tripping over the blocking device 11.

Figure 4:
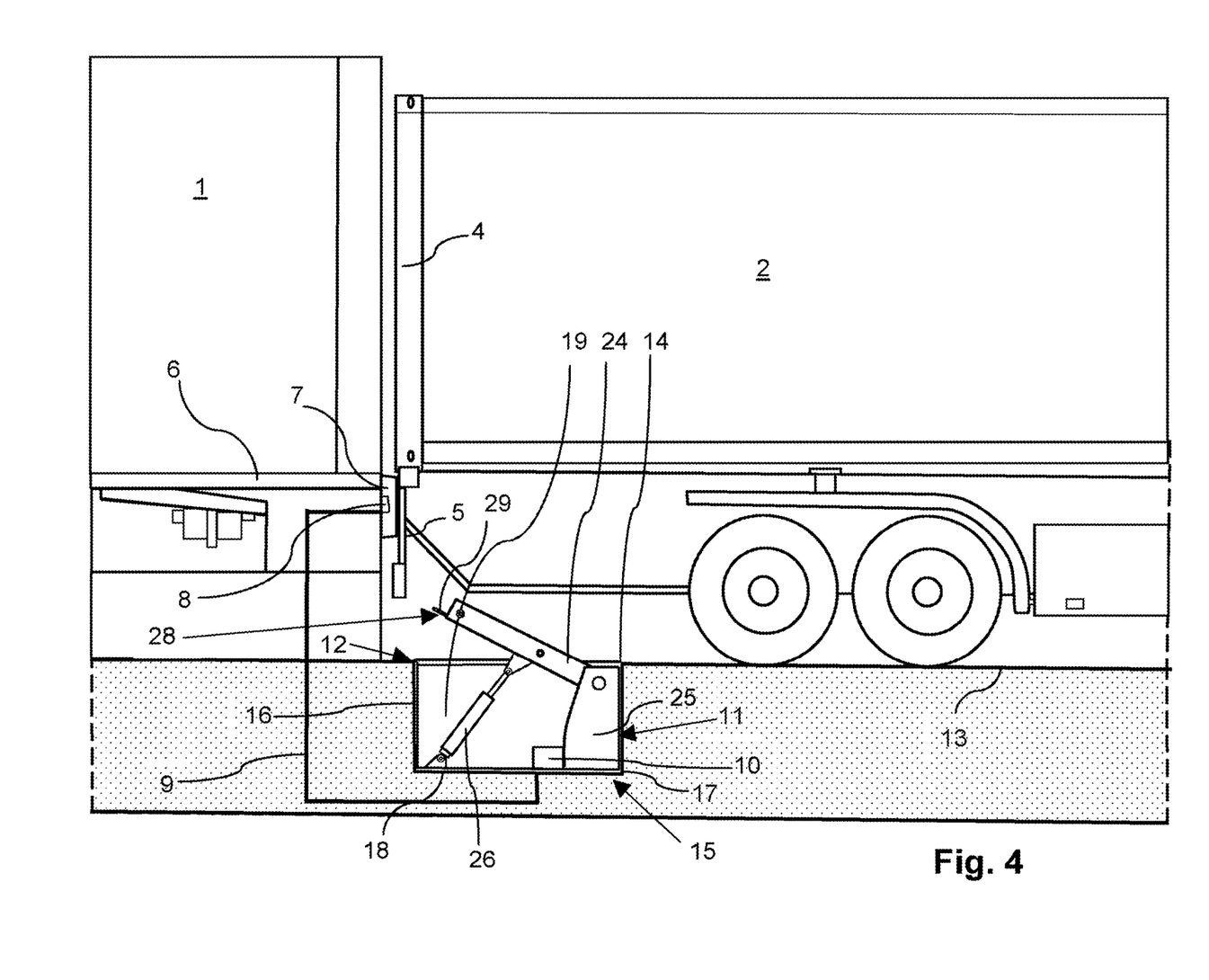
FIG. 4 depicts a third side view of the loading and unloading station including the blocking device according to FIG. 2.

After the housing 15 has been opened, the blocking arm 24 of the blocking device 11 is moved out of the housing 15 by operating the piston rod 26 (FIG. 4).

Figure 5:
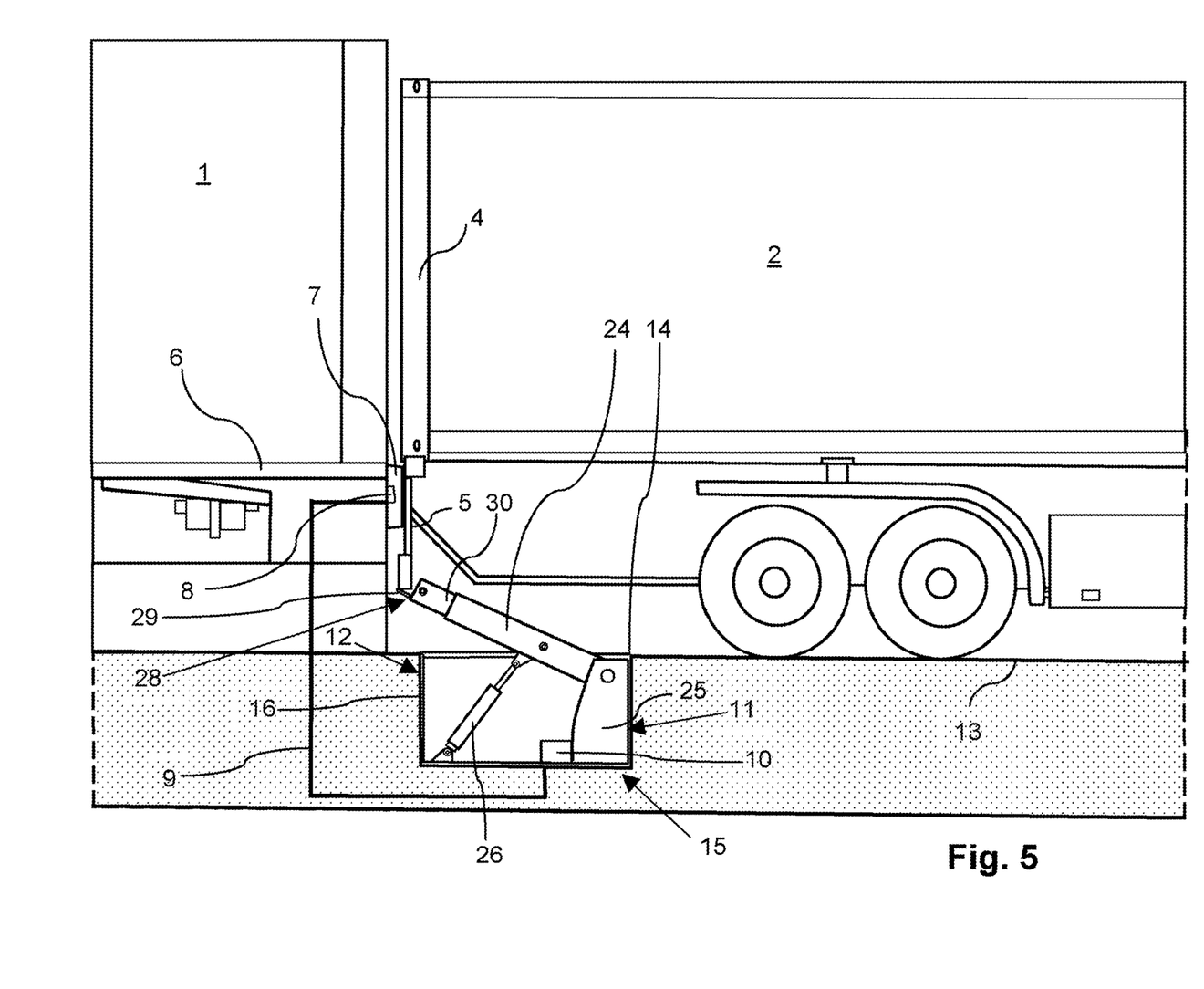
FIG. 5 depicts a fourth side view of the loading and unloading station including the blocking device according to FIG. 4.

Subsequently the plunger 28 is extended in the direction of the truck underride guard 5 until the first section 29 is in contact with the truck underride guard 5 (FIG. 5). Here the second section 30 of the plunger 28 is also extended at least partially out from the blocking arm 24. The first section 29 is preferably configured as a pressure switch 29, which indicates whether the plunger 28 is still in contact with the truck underride guard 5 of the truck 2. If the plunger 28 is no longer in contact with the truck underride guard 5, then a signal is emitted to the control unit 10, which causes the plunger 28 to be moved toward the truck underride guard 5 until the plunger 28 is again in contact with the truck underride guard 5. Thus the pressure switch 29 ensures that the truck 2 always remains positioned on the ramp 6. Thus it is not possible for the truck 2 to move away.

Figure 6:
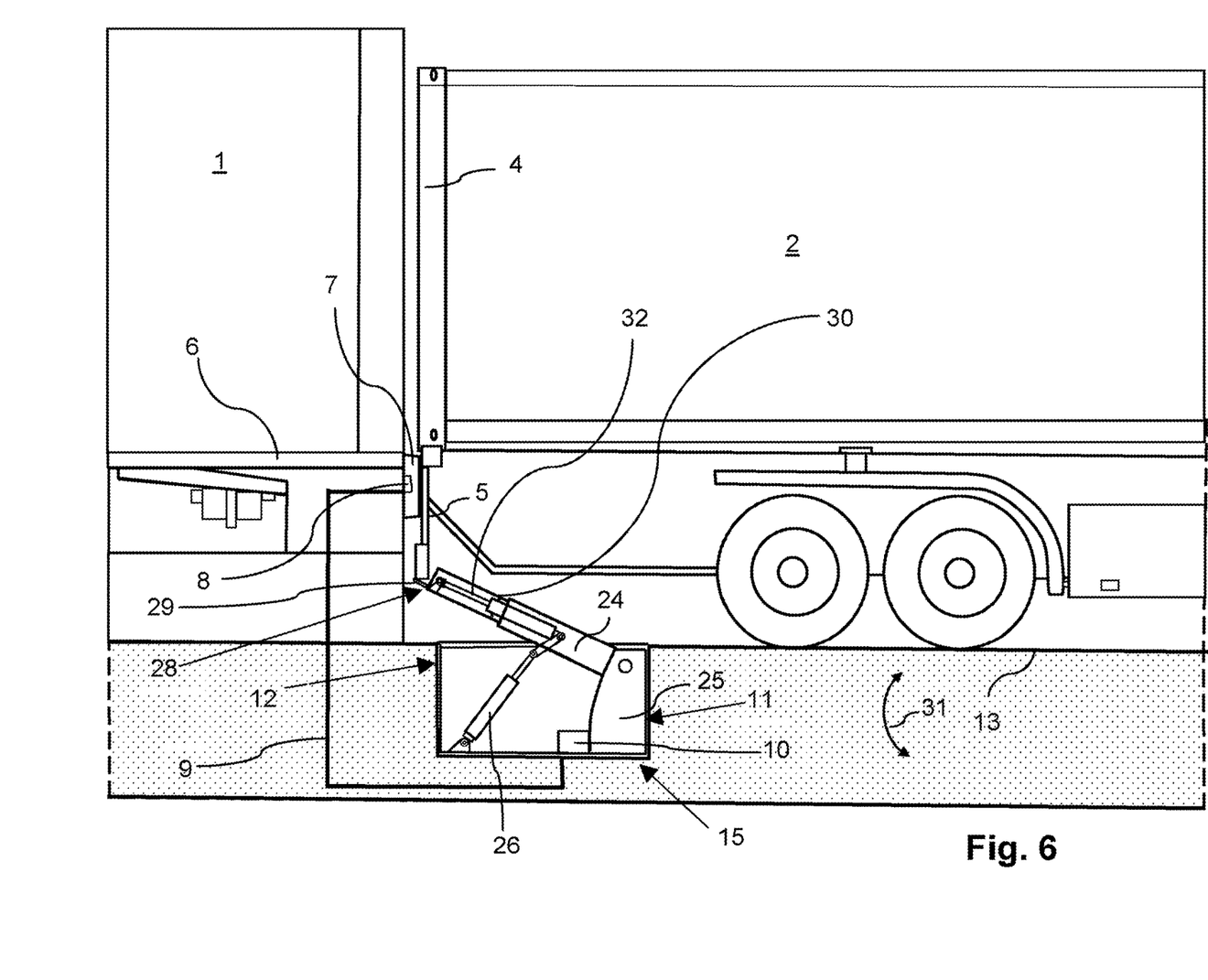
FIG. 6 depicts a fifth side view of the loading and unloading station including the blocking device according to FIG. 5, and FIG. 7 provides a perspective plan view of a variant of the blocking device shown in FIG. 2.

FIG. 6 essentially corresponds to FIG. 5, wherein in FIG. 6 the inner workings of the blocking device 11 are shown in somewhat more detail. For the sake of clarity a portion of the reference numbers are therefore not shown.

The blocking device 11 includes a housing 15 and features a retainer 25 on which the blocking arm 24 is disposed in a height-adjustable manner, as is indicated by the double arrow 31. In the blocking arm 24 a telescopable plunger 28 is disposed, which is comprised of a first front section 29 and a second rear section 30. The first section 29 is in contact with the truck underride guard 5 of the truck 2, whereas the second section 30 is still partially disposed in the blocking arm 24. The blocking arm 24 is hydraulically, electrically, or mechanically movable using the piston rod 26. This piston rod 26 is connected to an inner piston rod 32, via which the plunger 28 can be moved toward the truck underride guard 5, or the plunger 28 can be moved by its second section 30 back in the blocking arm 24. The movement of the inner piston rod 32 is effected in the same manner as that of the piston rod 26, i.e., also hydraulically, electrically, or mechanically.

Figure 7:
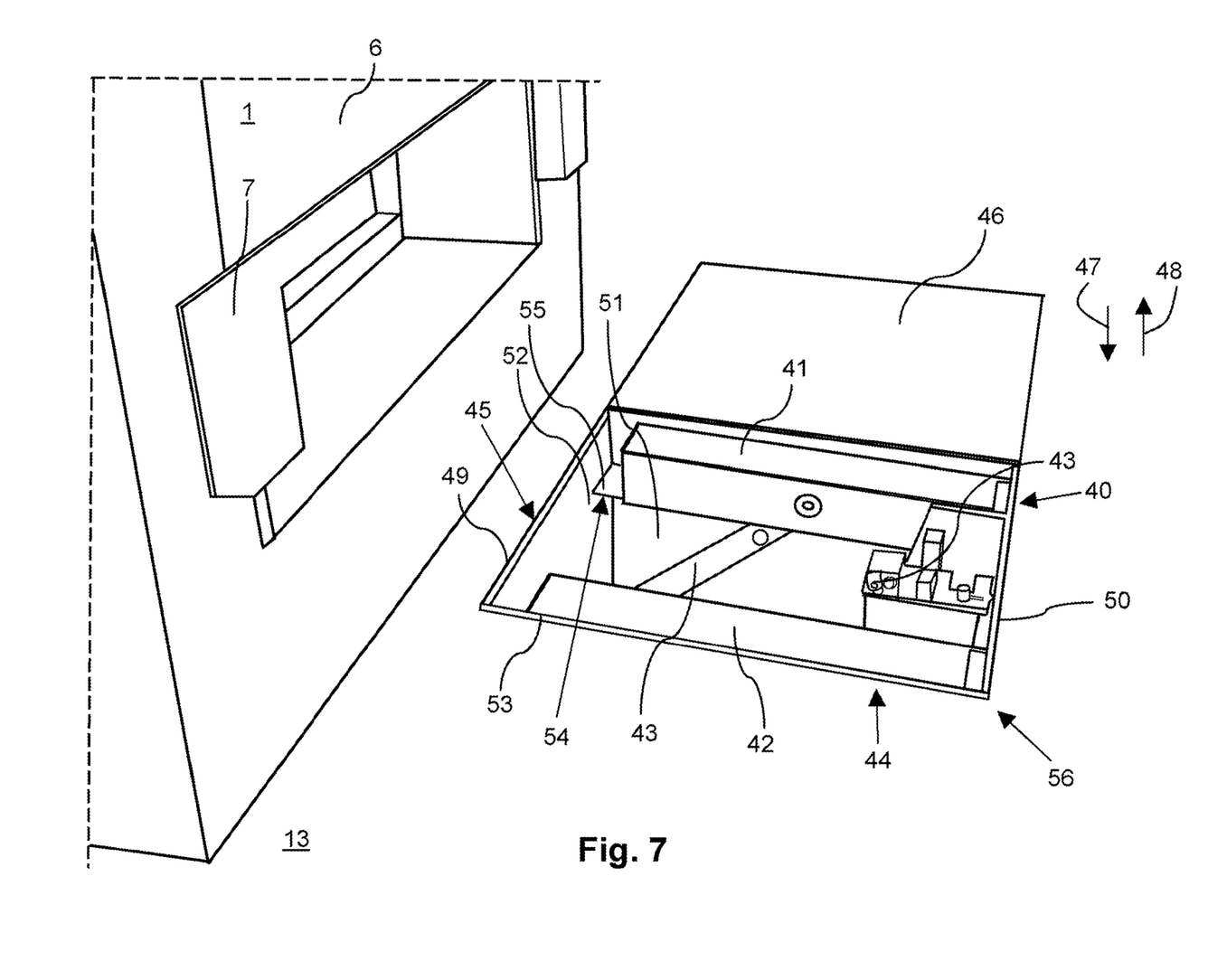

In FIG. 7 a perspective plan view is depicted of a variant of the blocking device 40 shown in FIG. 2. A truck that has driven up the ramp 6 is not depicted in FIG. 7 so that the blocking device 40 is clearly visible.

In contrast to the blocking device 11 in FIG. 2, the blocking device 40 according to FIG. 7 includes two height-adjustable blocking arms 41, 42, between which a control unit 43 is disposed. The control unit 43—like the control unit 10—is connected via a line to a sensor, which is provided in the buffer 7 of the loading and unloading station 1. Line and sensor are not depicted in FIG. 7. The blocking arms 41, 42 can be moved hydraulically, electrically, or mechanically via piston rods, wherein in FIG. 7 only the piston rod 43 of the blocking arm 41 is visible.

The blocking device 40 features a housing 44 which is disposed in a shaft 45. Here only three side walls 51, 52, 53 of the housing 44 are visible. The cover 46 has been removed so that the housing 44 is opened. In order that the cover 46 can be removed, the blocking device 40 includes two rails 49, 50 disposed parallel to each other, on which the cover 46 can be moved in the direction of the arrows 47, 48. To open the housing 44, the cover 46 is moved along the rails 49, 50 in the direction of the arrow 48, and to close the housing 44, the cover 46 is moved in the direction of the arrow 47.

In each blocking arm 41, 42 a telescopable plunger is provided, which can be driven out from the corresponding blocking arm 41, 42. In FIG. 7 only the plunger 54 can be seen. Like the plunger 28, the plunger 54 is also comprised of two sections, namely a first front and a second rear section, wherein the front section 55 is preferably configured as a pressure switch 55 or includes such a pressure switch 55. If a truck 2 has driven up onto the loading and unloading station 1, then the housing 44 is opened, and then both blocking arms 41, 42 are simultaneously extended. The plungers 54 are subsequently extended from the corresponding blocking arms 41, 42 until their first front sections 55 are in contact with the truck underride guard 5 (not depicted). The operation of the blocking device 40 thus does not differ from that of the blocking device 11. Together with the loading and unloading station 1, the blocking device 40 also forms an assembly 56.

However, the cover 46 can also be fixedly installed, whereby the housing 44 cannot be completely opened and the rails 49, 50 can be omitted. Instead, two openings are provided (not depicted), wherein the corresponding blocking arm 41, 42 can be extended from each one of these openings. During the rest position the blocking arms 41, 42 lie in the corresponding opening, so that the blocking arms 41, 42 form a plane with the cover 46 and the base 13. Thus a person is prevented from tripping over the blocking device 40.

The blocking devices 11, 40 can be embodied such that It is possible to disable the suspension or that the vehicle body is fixated.

What is claimed is:

1. A blocking device for a truck, comprising:
a height-adjustable blocking arm for installation in a shaft in a base in front of a ramp of a loading and unloading station,
wherein the at least one blocking arm is extendable from the shaft and includes a telescopable plunger, wherein a section of the blocking arm including the plunger is movable and pivotable until the telescopable plunger is oriented obliquely upward and against the direction of travel of the truck and until the telescopable plunger contacts the underride guard when the truck is located on the base adjacent the ramp, the plunger including a pressure switch which initiates a signal when the plunger is not in contact with the underride guard, the signal causing the plunger to be adjusted in order to contact the underride guard and fix the truck underride guard between the plunger of the at least one blocking arm and the ramp, and thus prevent a rolling-away or driving-away of the truck.

2. The blocking device according to claim 1, wherein the blocking device is configured to be sunk in the base in the shaft in front of the ramp and includes a cover that is flush with the base and closable with the shaft.

3. The blocking device according to claim 2, wherein the blocking device is housed in a housing removable from the shaft.

4. The blocking device according to claim 1, wherein the blocking device includes two blocking arms, wherein each of the blocking arms includes a telescopable plunger.

5. The blocking device according to claim 4, wherein each plunger includes a pressure switch, via which the plunger of the at least one blocking arm is readjustable.

6. The blocking device according to claim 1, wherein the blocking device comprises a sensor which is used to determine whether the truck has driven up onto the base adjacent the ramp of the loading and unloading station.

7. An assembly comprising:
the blocking device according to claim 1, and
a loading and unloading station including
a ramp, and
a shaft housed in the base in front of the ramp, wherein the blocking device is housed in the shaft.

8. A method for blocking a truck via a blocking device (11, 40) having a height-adjustable blocking arm (24, 41, 42) intended for installation in a shaft (12, 45) in a base (13) in front of a ramp (6) of a loading and unloading station (1), wherein the at least one blocking arm (24, 41, 42) is extendable from the shaft (12, 45) and includes a telescopable plunger (28, 54), wherein a section of the blocking arm including the plunger (28, 54) is movable and pivotable until the telescopable plunger is oriented obliquely upward and against the direction of travel of the truck to contact the underride guard when the truck is located on the base adjacent the ramp, the plunger including a pressure switch which initiates a signal when the plunger is not in contact with the underride guard, the signal causing the plunger to be adjusted, in order to contact the underride guard and fix the truck underride guard (5) between the plunger (28, 54) of the at least one blocking arm (24, 41, 42) and the ramp (6), and thus prevent a rolling-away or driving-away of the truck (2), the blocking device being part of an assembly further having the loading and unloading station including the ramp and the shaft housed in the base in front of the ramp, wherein the blocking device further includes a sensor and is housed in the shaft, the method comprising the following successive steps:
(a) allowing a truck to drive onto the base adjacent the ramp of the loading and unloading station;
(b) registering, via the sensor that the truck has driven onto the ramp of the loading and unloading station, and emitting a signal to a control unit of the blocking device;
(c) in response to the signal, driving the at least one blocking arm out of the shaft disposed in the base in front of the ramp,
(d) in response to the signal, moving the plunger of the at least one blocking arm until the plunger is oriented obliquely upward and against the direction of travel of the truck and until the plunger is contacting the underride guard,
(e) the pressure switch of the plunger initiating a signal when the plunger is not in contact with the underride guard, and
(f) in response to the signal from the pressure switch, adjusting the plunger in order to contact the underride guard, so that the truck underride guard is fixed between the plunger of the at least one blocking arm and the ramp.

9. The method according to claim 8, further comprising the step of removing the cover of the blocking device between step b and step c.

10. The method according to claim 8, wherein the plunger includes a stop surface on a front section, wherein step (d) includes telescopically extending the blocking arm obliquely upward and against the direction of travel of the truck until the stop surface of the plunger abuts the underride guard, and
step (f) includes pressing the underride guard with a force component acting against the direction of travel of the truck until the truck is fixed between the plunger and the ramp.

* * * * *